(12) United States Patent
Hong

(10) Patent No.: US 7,748,295 B2
(45) Date of Patent: Jul. 6, 2010

(54) TIRE-REPAIR BOTTLE

(75) Inventor: David Hong, Hong Kong (HK)

(73) Assignee: Active Tools International (HK) Ltd., Causeway Bay (HK)

(*) Notice: Subject to any disclaimer, the term of this patent is extended or adjusted under 35 U.S.C. 154(b) by 760 days.

(21) Appl. No.: 11/709,832

(22) Filed: Feb. 23, 2007

(65) Prior Publication Data

US 2008/0202632 A1    Aug. 28, 2008

(51) Int. Cl.
*B29C 73/08* (2006.01)

(52) U.S. Cl. .................. 81/15.6; 141/38; 141/104; 141/105; 141/114; 141/313; 137/223

(58) Field of Classification Search .............. 141/5, 141/38, 44, 65–67, 98, 100, 104, 105, 114, 141/231, 285, 301, 313; 222/372; 81/15.2, 81/15.6; 137/223–234.5, 597, 602, 605–607; 152/509
See application file for complete search history.

(56) References Cited

U.S. PATENT DOCUMENTS 7,389,800 B2 * 6/2008 Hickman et al. .............. 141/26
2006/0217662 A1 * 9/2006 Hickman et al. ............. 604/153
2008/0257448 A1 * 10/2008 Hickman et al. .............. 141/26

\* cited by examiner

*Primary Examiner*—Gregory L Huson
*Assistant Examiner*—Jason K Niesz
(74) *Attorney, Agent, or Firm*—Bacon & Thomas, PLLC

(57) ABSTRACT

A tire-repair bottle includes a latex bottle, a balloon mounted in an inlet of the bottle, a connector fastened to an extension tube at the inlet of the bottle and connected to an air compressor through an air hose, a connector fastened to an extension tube at an outlet of the bottle to hold a one-way valve and to secure a fluid hose for connection to a tire to be repaired. When the balloon is inflated by the air compressor to increase the pressure inside the bottle, the one-way valve is opened for enabling latex to flow out of the bottle through the flow guide into the tire that is connected to the connector at the outlet of the bottle, and the balloon explodes when inflated to a predetermined status to touch a sharp point of the bottle, for enabling compressed air to enter the tire.

5 Claims, 6 Drawing Sheets

TIRE-REPAIR BOTTLE

BACKGROUND OF THE INVENTION (a) Field of the Invention

The present invention relates generally to a tire-repair bottle and more particularly, to such a tire-repair bottle that automatically repairs a broken tire with latex.

(b) Description of the Prior Art

A driver may encounter a tire explosion accident when the wheels run over a nail or sharp object during driving. When one tire is broken during driving, it may cause an unexpected disaster. Further, the broken tire must be quickly repaired.

There is known a commercial tire-repair bottle, which comprises a flexible bottle containing a tire repairing fluid (latex), and a nozzle tip extending from the neck of the flexible bottle and connectable to the air valve of a tire. When in use, the nozzle tip is connected to the air valve of the tire to be repair, and then compress the flexible bottle with the hands to force latex out of the flexible bottle through the nozzle tip into the tire. This manual operation requires much effort during application. Further, this structure of tire-repair bottle does not meet environmental protection requirements because it is not reusable and must be thrown away after its service.

SUMMARY OF THE INVENTION

According to one aspect of the present invention, the tire-repair bottle comprises a bottle containing latex, an air intake device, which comprises a balloon mounted in an inlet of the bottle and a connector fastened to an extension tube at the inlet of the bottle and connected to an air compressor through an air hose, and a flow guide, which comprises a connector fastened to an extension tube at an outlet of the bottle to secure a fluid hose for connection to a tire to be repaired and a one-way valve mounted in the connector. When the balloon is inflated by the air compressor to increase the pressure inside the bottle, the one-way valve is opened for enabling latex to flow out of the bottle through the flow guide into the tire that is connected to the connector at the outlet of the bottle, and the balloon explodes when inflated to a predetermined status to touch a sharp point of the bottle, for enabling compressed air to enter the tire. By means of the tire-repair bottle, the tire repairing work can easily be achieved with less effort.

According to another aspect of the present invention, the connector that is fastened to the extension tube at the inlet of the bottle secures the balloon in place. After each repair work, the connector is removed from the extension tube at the inlet of the bottle for a supply of latex and replacement of a new balloon. Therefore, the tire-repair bottle can be used repeatedly, meeting environmental protection requirements.

According to another aspect of the present invention, the sharp point is formed integral with the inside wall of the bottle at one side of the outlet or any suitable location inside the bottle. When the balloon in inflated to the saturated status to touch the sharp point, it explodes automatically.

According to still another aspect of the present invention, the one-way valve of the flow guide allows latex to flow out of the bottle into the tire to be repaired, and prohibits reverse flow of latex.

DETAILED DESCRIPTION OF THE PREFERRED EMBODIMENTS

Figure 1:
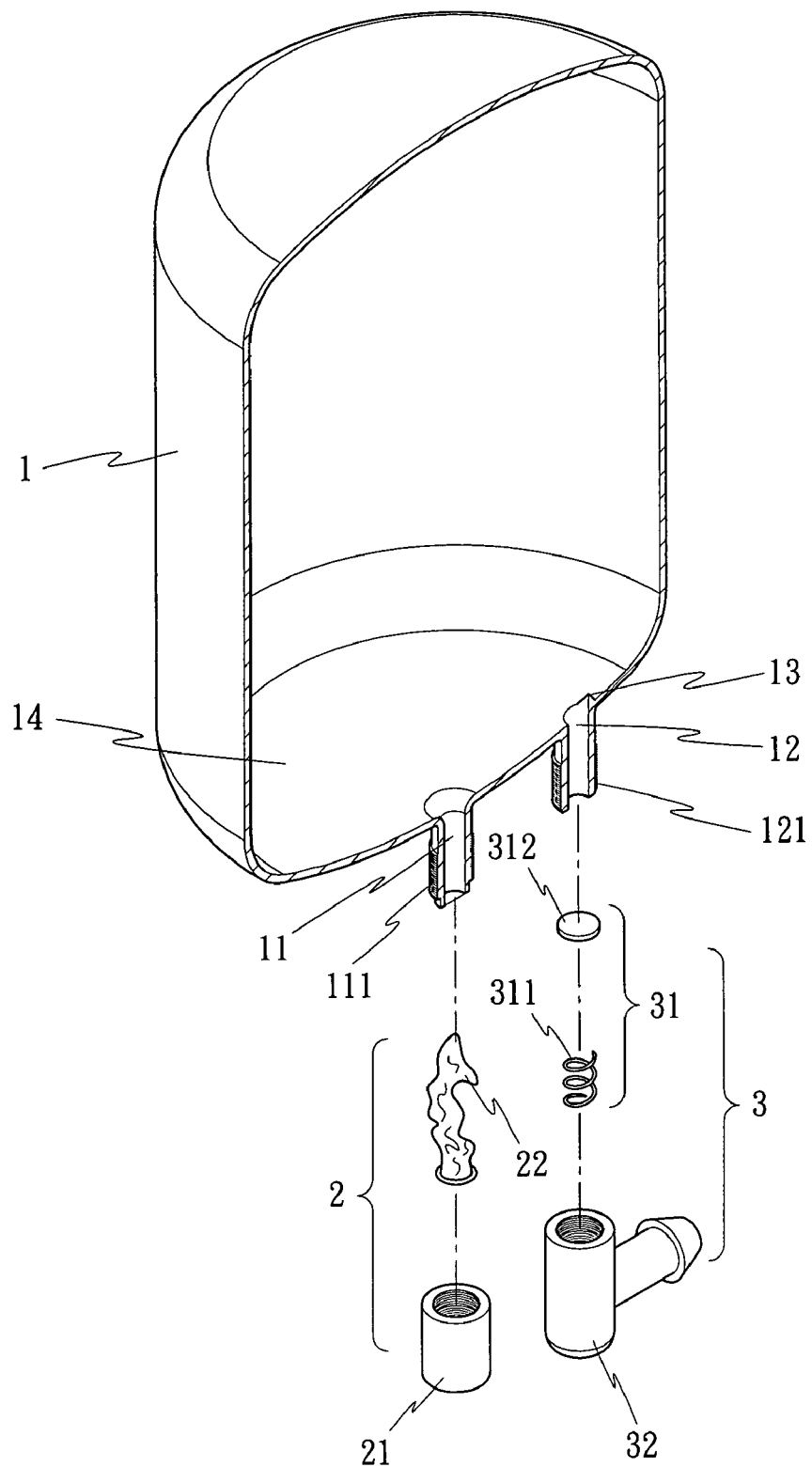
FIG. 1 is an exploded view of a tire-repair bottle according to the present invention (the bottle in sectional elevation).

Referring to FIG. 1, a tire-repair bottle in accordance with the present invention is shown comprised of a bottle 1, an air intake device 2, and a flow guide device 3.

Figure 2:
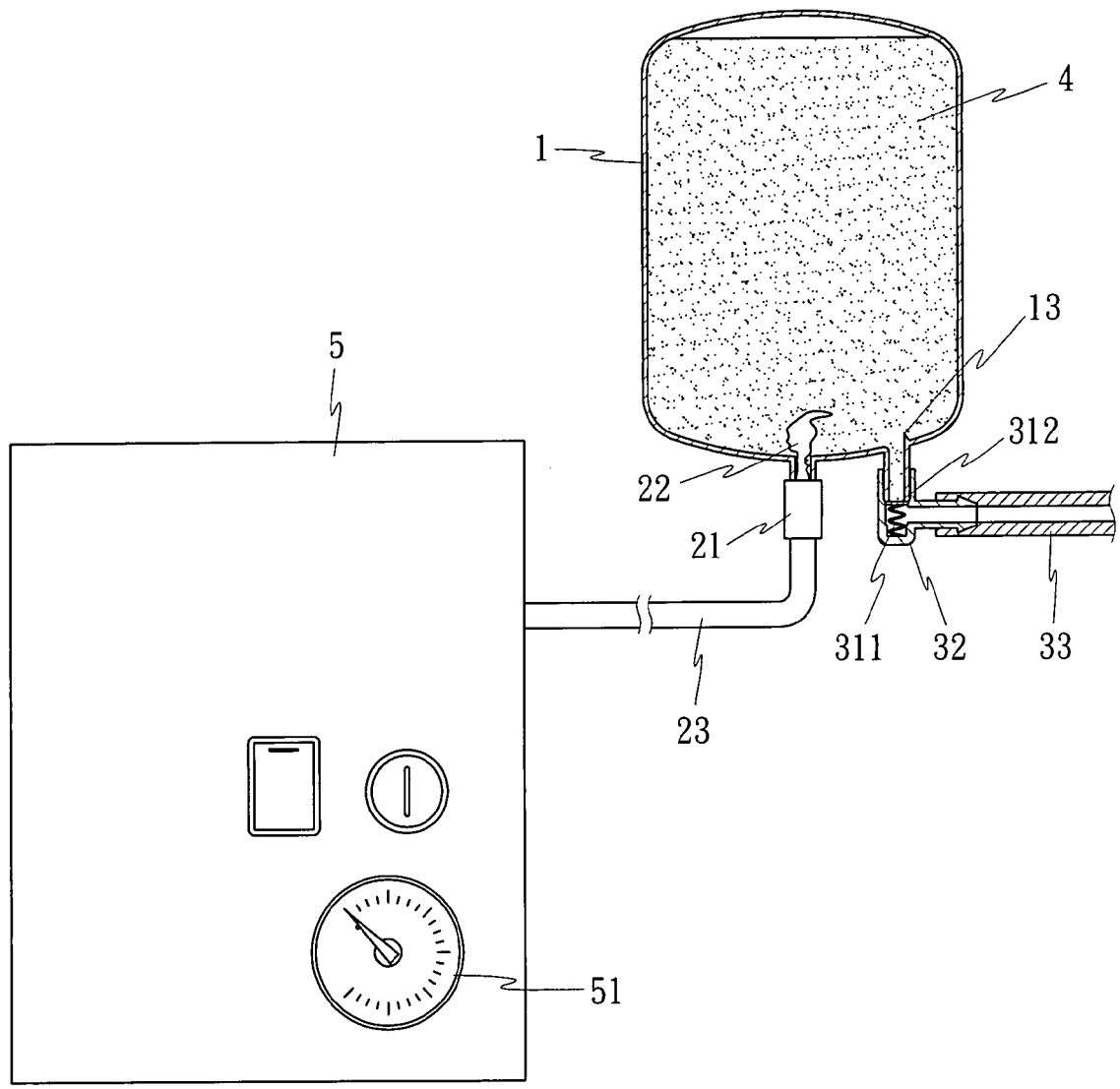
FIG. 2 is a schematic sectional view of the present invention, showing the tire-repair bottle connected to an air compressor.

The bottle 1 is an enclosed container containing a tire repairing fluid, for example, latex 4 (see FIG. 2), having an inlet 11 and an outlet 12 for the connection of the air intake device 2 and the flow guide device 3 respectively. The inlet 11 and the outlet 12 are directly formed on the bottom side of the bottle 1, each having an extension tube 111 or 121 for the connection of the air intake device 2 and the flow guide device 3 respectively. The bottle 1 further has a sharp point 13 protruded from the inside wall at a suitable location. As illustrated, the sharp point 13 is protruded from the inside wall of the bottle 1 at one side of the outlet 12.

The intake device 2 comprises a connector 21 and a balloon 2. The balloon 2 is fastened to the inlet 11 and suspending inside the bottle 1. The connector 21 is threaded onto the extension tube 111 to secure the balloon 2 to the inlet 11, and connected to an air compressor 5 through an air hose 23. By means of operating the air compressor 5, the balloon 2 is inflated.

Figure 3:
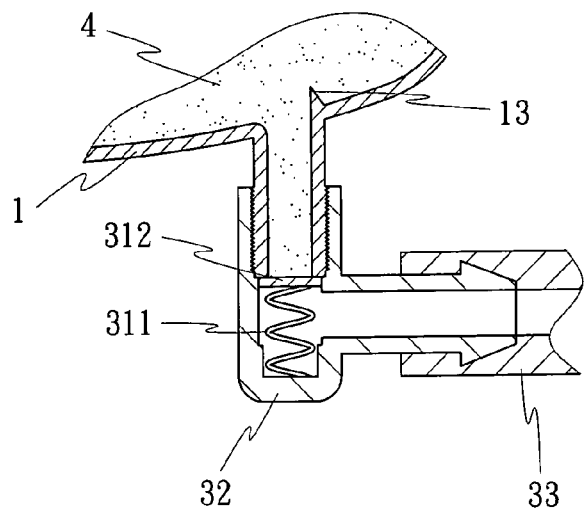
FIG. 3 is a schematic sectional view in an enlarged scale of a part of the present invention, showing the flow guide device closed.
Figure 4:
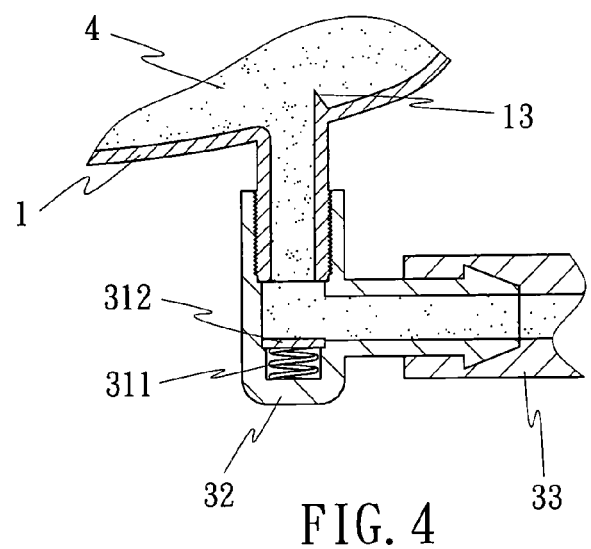
FIG. 4 is similar to FIG. 3 but showing the flow guide device opened.

The flow guide device 3 comprises a one-way valve 31 and a connector 32. The one-way valve 31 is mounted in the connector 32, and comprised of a spring 311 and a valve pad 312 (see FIG. 3). The connector 32 is a two-way connector, having one end fastened to the extension tube 121 of the outlet 12 and the other end for connection to the air valve of the tire to be repaired through a latex hose 33. When the one-way valve 31 is opened, latex 4 is forced into the tire (see FIG. 4).

Figure 5:
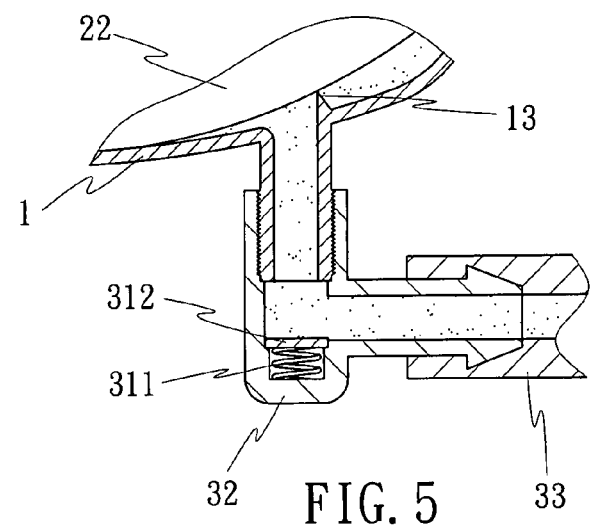
FIG. 5 is similar to FIG. 4, showing the inflated balloon touched the sharp point.
Figure 6:
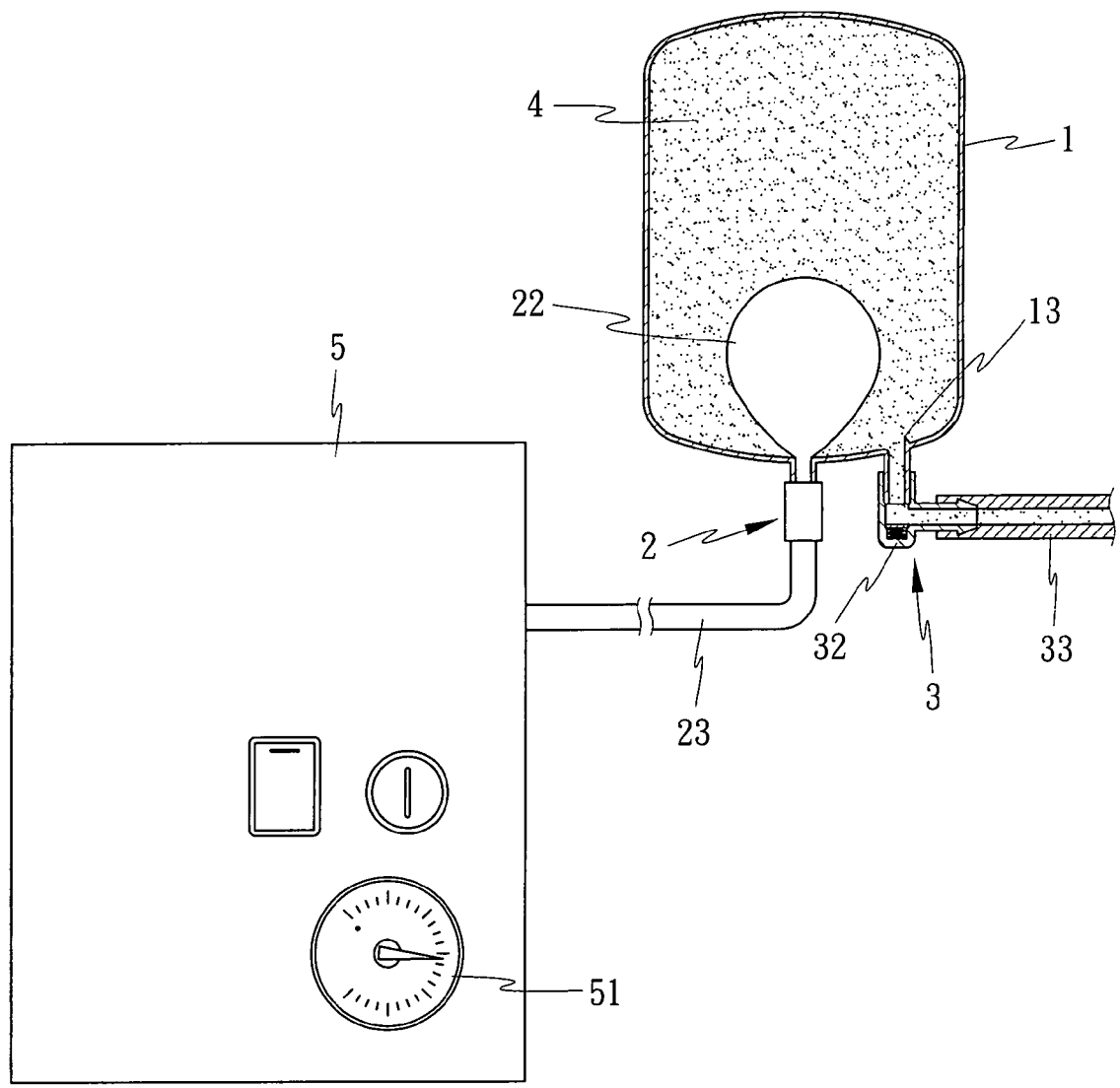
FIG. 6 corresponds to FIG. 2, showing an initial inflation status of the balloon.
Figure 7:
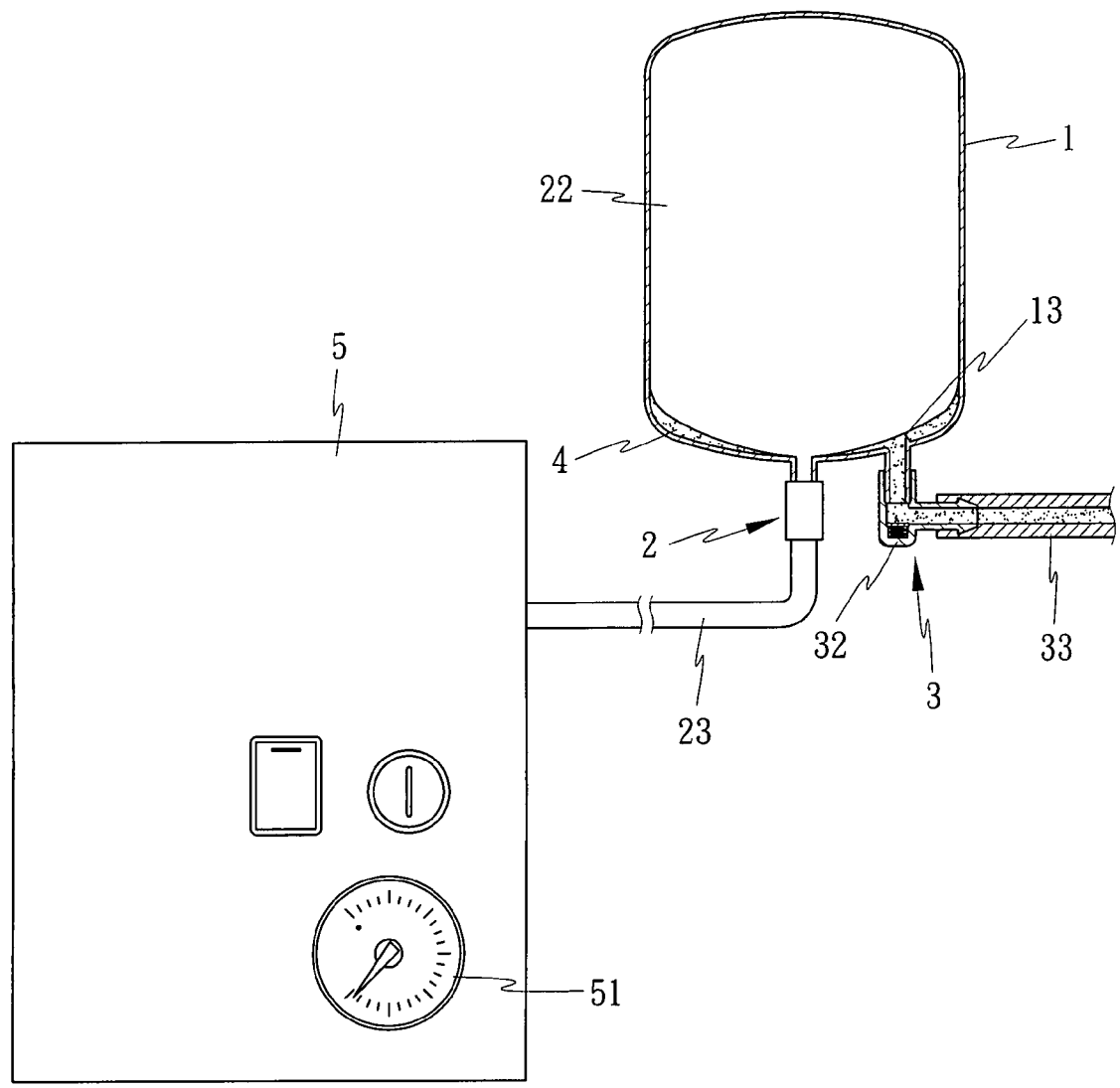
FIG. 7 corresponds to FIG. 6, showing the balloon inflated to the saturated status.
Figure 8:
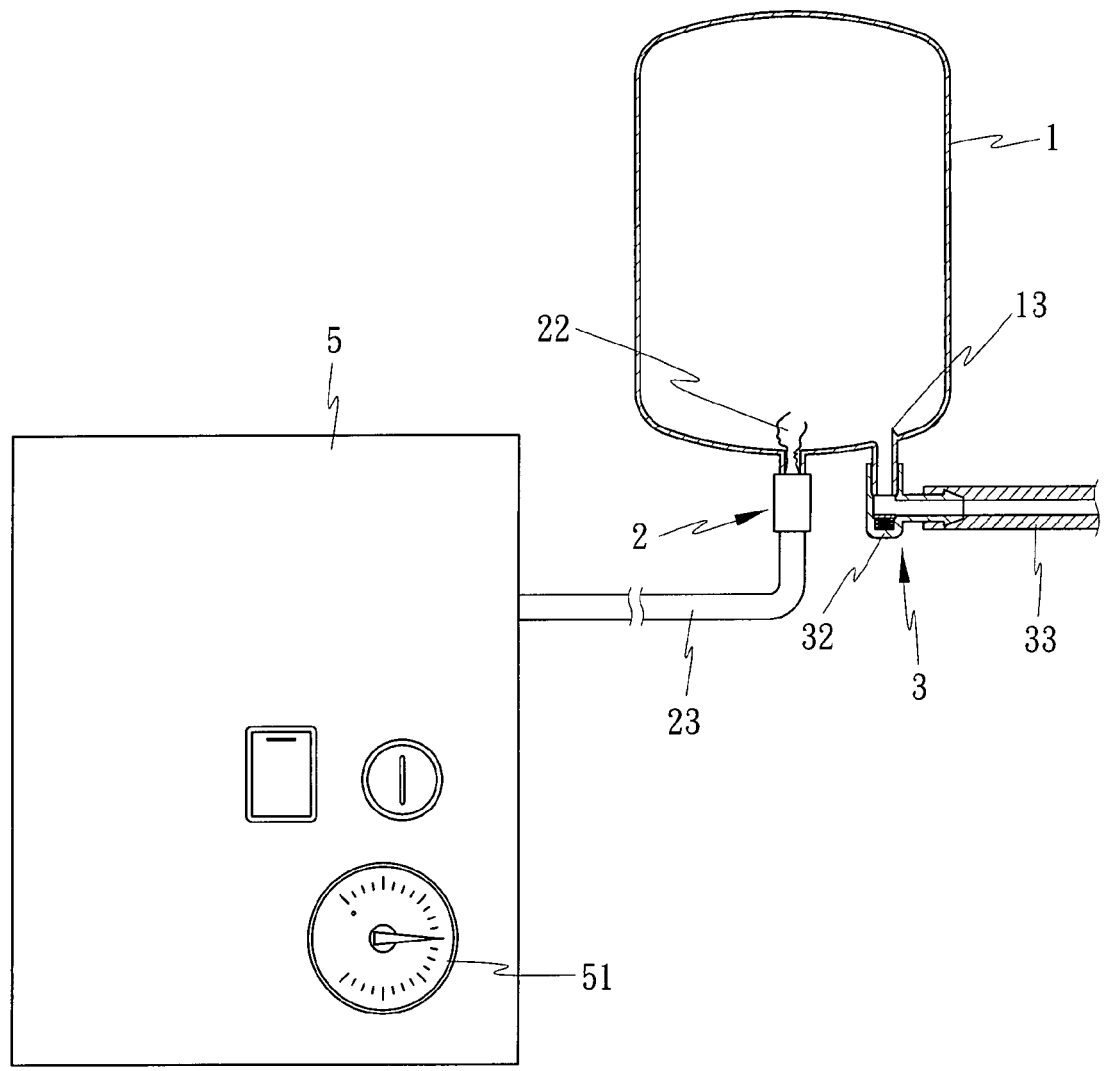
FIG. 8 corresponds to FIG. 7, showing the balloon exploded.

When in use, the air compressor 5 is operated to inflate the balloon 22 (see FIG. 6). When the balloon 2 expands, it forces latex 4 out of the bottle 1 to open the one-way valve 31 of the flow guide device 3 and to flow into the tire (see FIG. 3). When the balloon 2 expands to a predetermined extent (see FIGS. 5 and 7) and touches the sharp point 13, it will explode (see FIG. 8). When the balloon 22 exploded, air is continuously forced into the tire to inflate the tire. This tire repairing operation is quite simple and laborsaving.

During application, the connector 21 is threaded onto the extension tube 111 to secure the balloon 2 to the inlet 11 inside the bottle 1, and then the air hose 23 of the air compressor 5 is connected to the connector 21. After each tire repair work (explosion of the balloon 22), remove the connector 21, and refill latex 4 in the bottle 1, and install a new balloon 22. Thus, the tire-repair bottle can be used repeatedly, meeting environmental protection requirements.

Further, the inlet 11 of the bottle 1 or the outer end of the connector 21 is sealed with a cap (not shown) before application to protect the tire-repair bottle against dust and to prevent leakage.

The aforesaid flow guide 3 prohibits leakage of latex 4 before application of the tire-repair bottle. During a repair work, the flow guide 3 allows latex 4 to flow in one direction toward the tire to be repaired, prohibiting a reverse flow of latex 4.

Further, before operation of the air compressor 5, the pressure gage 51 of the air compressor 5 is set at a rated pressure value. When started, the air compressor 5 automatically pumps air into the bottle 1 to inflate the balloon 22 and then into the tire to be repaired after explosion of the balloon 22.

As stated above, the sharp point 13 is formed integral with the inside wall of the bottle 1, the balloon 22 will explode automatically when inflated to the extent where the surface of the balloon 22 touches the sharp point 13. This arrangement is artful, and does not waste or occupy the limited inside space of the bottle 1.

A prototype of tire-repair bottle has been constructed with the features of FIGS. 1~8. The tire-repair bottle functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A tire-repair bottle comprising:

a bottle containing a tire repairing fluid, said bottle having an inlet and an outlet at a bottom side thereof, a first extension tube extended outwards from said inlet, a second extension tube extended outwards from said outlet, and a sharp point protruded from an inside wall thereof;

an air intake device, said air intake device comprising a balloon mounted in said inlet and suspending inside said bottle, and a connector fastened to said first extension tube of said bottle and connected to an air compressor through an air hose; and a flow guide, said flow guide comprising a connector fastened to said second extension tube of said bottle to secure a fluid hose for connection to a tire to be repaired, and an one-way valve installed in the connector of said flow guide for allowing said tire repairing fluid to flow out of said bottle through said outlet and said flow guide when the pressure inside said bottle surpassed a predetermined level;

wherein said air compressor is started to pump air into said balloon, said balloon is inflated to increase the pressure inside said bottle, thereby opening said one-way valve for enabling said tire repairing fluid to flow out of said bottle through said flow guide into the tire that is connected to the fluid hose at the connector of said flow guide, and said balloon explodes when inflated to a predetermined status to touch said sharp point of said bottle, for enabling compressed air to enter the tire.

2. The tire-repair bottle as claimed in claim 1, wherein said sharp point is disposed at one side of said outlet.

3. The tire-repair bottle as claimed in claim 1, wherein said sharp point is protruded from an inside wall of the bottom side of said bottle.

4. The tire-repair bottle as claimed in claim 1, wherein said one-way valve comprises a spring member mounted inside the connector of said flow guide device, and a valve pad supported on said spring member and forced by said spring member to stop said outlet of said bottle.

5. The tire-repair bottle as claimed in claim 1, wherein the connector of said air intake device secures said balloon to said inlet of said bottle when threaded onto said first extension tube.

* * * * *